(12) United States Patent
DiBello et al.

(10) Patent No.: US 9,241,498 B2
(45) Date of Patent: Jan. 26, 2016

(54) METHOD OF INJECTING SOLUTION INTO A MISTING LINE

(71) Applicant: PuriCore, Inc., Malvern, PA (US)

(72) Inventors: Gerald N. DiBello, West Chester, PA (US); Noel J. Pixley, Exton, PA (US); Roger D. Hall, Henderson, NV (US); Geoffrey Richard Koontz, Exton, PA (US)

(73) Assignee: PuriCore, Inc., Malvern, PA (US)

( * ) Notice: Subject to any disclaimer, the term of this patent is extended or adjusted under 35 U.S.C. 154(b) by 169 days.

(21) Appl. No.: 14/097,821

(22) Filed: Dec. 5, 2013

(65) Prior Publication Data

US 2014/0091157 A1 Apr. 3, 2014

Related U.S. Application Data

(63) Continuation of application No. 12/985,595, filed on Jan. 6, 2011, now Pat. No. 8,628,028.

(60) Provisional application No. 61/292,698, filed on Jan. 6, 2010.

(51) Int. Cl.
| | |
|---|---|
| A62C 5/02 | (2006.01) |
| B05B 7/26 | (2006.01) |
| A23B 7/158 | (2006.01) |
| A23L 3/3589 | (2006.01) |
| A47F 3/00 | (2006.01) |

(52) U.S. Cl.
CPC .............. *A23B 7/158* (2013.01); *A23L 3/3589* (2013.01); *A47F 3/001* (2013.01)

(58) Field of Classification Search
CPC ........ A23B 7/158; A23L 3/3589; A47F 3/001
USPC ......... 239/303, 304, 310, 398, 407, 305, 307, 239/416.2, 416.3
See application file for complete search history.

(56) References Cited

U.S. PATENT DOCUMENTS

| | | | | |
|---|---|---|---|---|
| 2,281,458 | A | * 4/1942 | Schadegg | A47F 3/0495 62/247 |
| 3,612,356 | A | * 10/1971 | McVey | A01M 7/0092 222/145.7 |
| 3,894,690 | A | 7/1975 | Hill | |
| 4,179,900 | A | * 12/1979 | Corrigan | A47F 3/0495 239/11 |
| 4,340,078 | A | 7/1982 | Pasley | |
| 4,391,390 | A | * 7/1983 | Howard | B01F 15/04 137/205.5 |
| 4,456,176 | A | * 6/1984 | Agius | A01M 7/0092 239/142 |
| 4,558,715 | A | 12/1985 | Walton et al. | |
| 4,756,329 | A | 7/1988 | Cloup | |
| 4,809,731 | A | 3/1989 | Walton et al. | |
| 4,882,189 | A | 11/1989 | Corrigan | |
| 5,022,585 | A | * 6/1991 | Burgess | A01C 23/042 239/310 |
| 5,269,443 | A | 12/1993 | Lancaster | |

(Continued)

OTHER PUBLICATIONS

Dosatron® Water Powered Dosing Technology D25 Range—brochure (2 pages) Copyright Dosatron International S.A.S. 2007.

(Continued)

*Primary Examiner* — Justin Jonaitis
(74) *Attorney, Agent, or Firm* — Stradley Ronon Stevens & Young, LLP

(57) ABSTRACT

A method and system of providing a mist in a grocery display that injects biocidal solution into a misting line of water during a phase of the misting cycle.

7 Claims, 4 Drawing Sheets

(56) References Cited

U.S. PATENT DOCUMENTS

| | | |
|---|---|---|
| 5,513,963 A | 5/1996 | Walton |
| 6,357,466 B1 | 3/2002 | Walton et al. |
| 6,431,198 B2 | 8/2002 | Walton et al. |
| 6,910,405 B2 | 6/2005 | Walton et al. |
| 7,131,454 B2 | 11/2006 | Walton et al. |
| 7,438,537 B2 | 10/2008 | Walton |
| 2006/0273186 A1 | 12/2006 | Corrigan et al. |
| 2007/0227961 A1 | 10/2007 | Barras et al. |
| 2011/0070346 A1* | 3/2011 | Spillner .................. A22C 9/00 426/281 |

OTHER PUBLICATIONS

Dosmatic® Non-Electric, Fluid Driven Proportional Injectors—MICRODOSII®—Dosmatic U.S.A./International, Inc. brochure (2 pages) modified Jun. 1, 2009.

Dosmatic® Non-Electric, Fluid-Driven Proportional Injectors—MINIDOS®—Dosmatic U.S.A./International, Inc. brochure (2 pages) May 9, 2009.

KES Science & Technology, Inc.—Food Safety Quality Freshness "Keys to a perishable business's success" (2 pages) http://www.kesscience.com/produceMisting.php Copyright 2007.

Prodew Misting & Humidification OASIS Keep Your Produce Fresh for Less brochure (1 page) Copyright Prodew, Inc. 2007.

Prodew Misting & Humidification Prodew 388 Misting Systems to Enhance Post-Harvest Preservation brochure (1 page) Copyright Prodew, Inc. 2007.

Ultramist™ brochure (2 pages) Corrigan Corporation of America (Nov. 21, 2007).

VersaFresh® Low Profile Mist Track by Prodew—Revolutionary Misting System for the New Millenium brochure (1 page) Copyright Prodew, Inc. 2008.

\* cited by examiner

METHOD OF INJECTING SOLUTION INTO A MISTING LINE

CROSS REFERENCE TO RELATED APPLICATIONS

This application is a continuation of U.S. patent application Ser. No. 12/985,595 filed Jan. 6, 2011 which claims the benefit of U.S. Provisional Application No. 61/292,698, filed Jan. 6, 2010, the contents of each of which are herein incorporated by reference in their entireties.

BACKGROUND OF THE INVENTION

The invention relates to injection of solutions into misting systems. In particular, the invention relates to injection of biocidal solutions into misting lines during a phase of the misting cycle.

Misting systems, or misters, are used in grocery stores to maintain produce and other food products and flowers at a desired dampness. Many of these systems include nozzles spaced along a rack, and usually include a time clock or other timing device to provide automatic misting.

Water, which may be filtered or treated, is supplied through misting lines and a mist is sprayed through the nozzles. These misting lines may build up biofilms over time that can cause contamination of fresh produce and promote biofilm growth on the rack. Water may also stay in the misting lines for long periods of time and become a breeding ground for unwanted bacteria. This problem is aggravated by the proximity of the bar to a bright visible light, which is often mounted proximate to the bar in many produce display cases. Further, sprayed water left on produce and other products may lead to the development of unwanted organisms.

To prevent contamination of the misting system and products, biocidal solutions may be added to the water. Mist that has both water and a biocidal solution may be used to kill harmful pathogens on contact to protect against cross contamination. It also may kill spoilage organisms to keep perishable products safer, fresher, and longer.

One way to add the biocidal solution is, during a pressurization phase, to inject the solution into the misting line through a doser, such as one produced by Hydro Systems Company, Cincinnati, Ohio and Dosatron International, Inc., Clearwater, Fla. A doser requires no power source, which is necessary with the use of a pump. Rather, the biocidal solution is drawn into the misting line via the mechanical flow of water. Water can be fed under pressure to the doser from any source, such as a pump or manifold valve. When the water moves through the doser, a percentage of biocide is drawn in, mixed with water, and then sent to the misting unit.

SUMMARY OF THE INVENTION

One aspect of this invention provides a system for providing a mist having a biocidal solution comprising a misting rack with at least one nozzle; a supply of water; a misting line connecting the supply of water to the misting rack; an injection line, having a solution valve, connecting a supply of the biocidal solution to the misting line; and a control system that opens the solution valve to inject the biocidal solution into the misting line such that the biocidal solution mixes with the water in the misting line and closes the solution valve after the biocidal solution is injected.

Another aspect of the invention provides a method of providing a mist in a grocery display comprising providing a misting rack with at least one nozzle, a supply of water, a supply of biocidal solution, a misting line connecting the supply of water to the misting rack and an injection line having a solution valve, connecting the supply of biocidal solution to the misting line receiving a signal; injecting the biocidal solution into the misting line based on the signal; mixing the water and the biocidal solution to form a mixture; increasing the pressure in the misting line; and spraying the mixture under pressure through the nozzles.

DETAILED DESCRIPTION OF THE INVENTION

Figure 1:
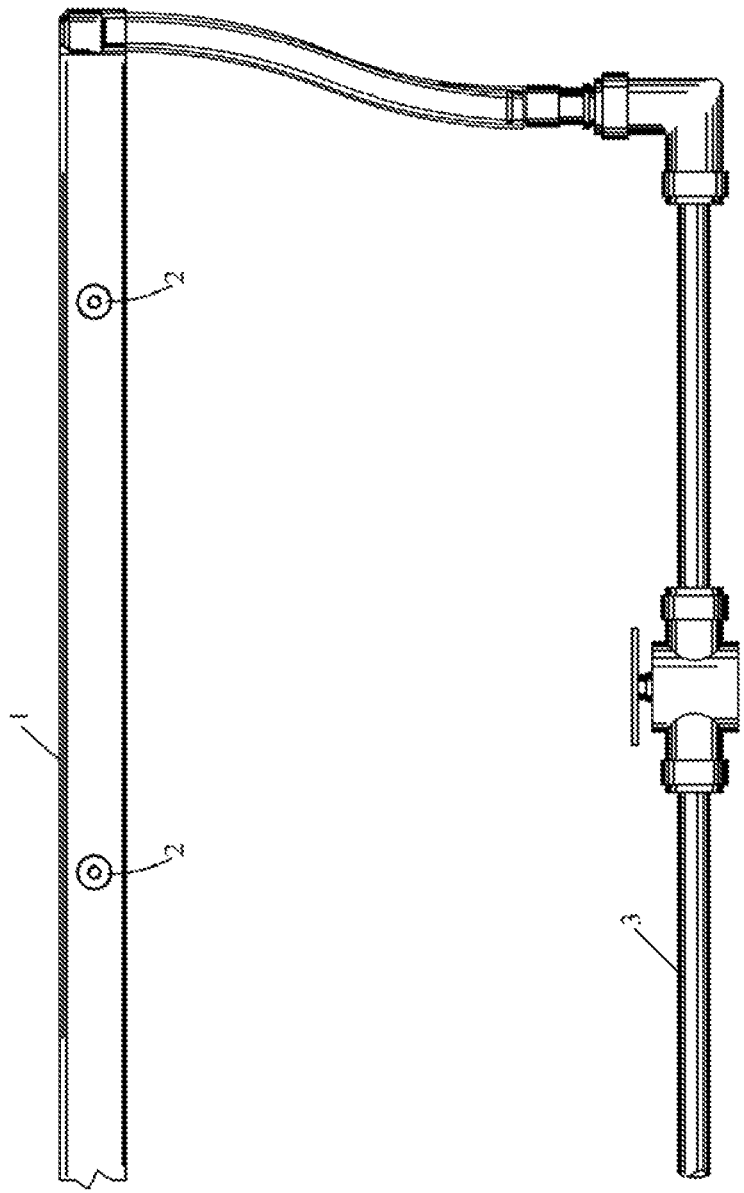
FIG. 1 shows a diagram of an exemplary mister bar, nozzles and misting line used in the invention.

The invention provides a misting system to inject biocidal solution into a misting line during a phase of the misting cycle. As shown in FIG. 1, misting systems may include a long mister bar 1 that extends the length of a produce display or other product display case and has nozzles 2 at spaced intervals along the length of the bar, or misting rack, 1. The number of nozzles vary, but in commercial applications, the number of nozzles along a rack range from 10 to 85 nozzles. Of course, if the misting system provides mist for a smaller or larger area than a typical chain grocery store, then the number of nozzles will increase or decrease appropriately.

A misting line, or tubing, 3 is attached to one or both ends of the misting rack 1, and a sufficient pressure is applied through each line to generate the desired misting action at the nozzles 2 throughout the length of the rack 1. Any type of tubing that is compatible with biocidal solutions may be used. The tubing that is used should be rated for the working pressure and for potable water. In one embodiment, the tubing is made of a cross-linked polyethylene. In another embodiment, the tubing is made of polyvinyl chloride (PVC). In yet another embodiment, the tubing is made of Teflon® manufactured by E. I. du Pont de Nemours and Company, Wilmington, Del.

The biocidal solution used in misting systems contains a high enough concentration of available free chlorine (AFC) to be sufficiently biocidal. An available free chlorine content of about 3 parts per million (ppm) to 300 ppm will generally provide biocidal properties for most applications. It is, however, appreciated that biocidal efficacy is also dependant on pH and that an appropriate balance must be achieved between pH and AFC in order to provide the desired level of biocompatibility and materials compatibility.

Any available biocidal solution may be used in the misting system of the invention. One example is a Sterilox® Solution produced by the Sterilox Food Safety System or other equipment provided by PuriCore, Malvern, Pa. The Sterilox Solution kills harmful pathogens and spoilage organisms, such as *E. coli*, salmonella, norovirus, psuedomonas, yeasts, and molds. When used on fresh food, the Sterilox Solution reduces the risk of infectious pathogens and enhances the product shelf life. Other exemplary biocidal solutions include any product-enhancing liquid, solid, or gas.

The misting cycle involves at least three phases: a pressurization phase, a purge phase, and a delay phase. Misting systems use a pressurized phase of about 3-15 seconds, where clean, pressurized water is pressurized in a tank and distributed through tubing to misting nozzles located in misting racks, also known as wet racks in grocery stores. Preferably, the water is purified before use. In a produce misting system, for example, the water is pressurized up to, preferably, about 75-125 psi. However, the pressure may range above and below that range. The water may be supplied from any source and may be tap water that may be filtered and/or purified. The flow rate of water varies due to the size of the system and number of nozzles and nozzle type. In one embodiment, 0.02 to 7 gallons per minute (gpm) (75 to 26,498 cm3/min) of water is provided.

During the pressurization phase, preferably, a pressure sensor on the misting line will detect the increase in pressure. This pressure sensor also detects a rapid drop in the pressure, which indicates that the misting system is the purge phase. Mist is sprayed through the nozzles during this pressurization phase.

After the pressurization phase, the misting line is bled of pressure for about 3-10 seconds through a short duration purge phase. During the purge phase, the pressure of the water is allowed to drop very low, usually to atmospheric pressure. After the purge phase, the misting system is inactive for a period of about 5-15 minutes before the next pressurization phase. This inactive phase is the delay, or idle, phase. It should be noted that although time ranges for the phases have been included above, these time ranges may vary inside and outside the range from operation to operation.

Figure 2:
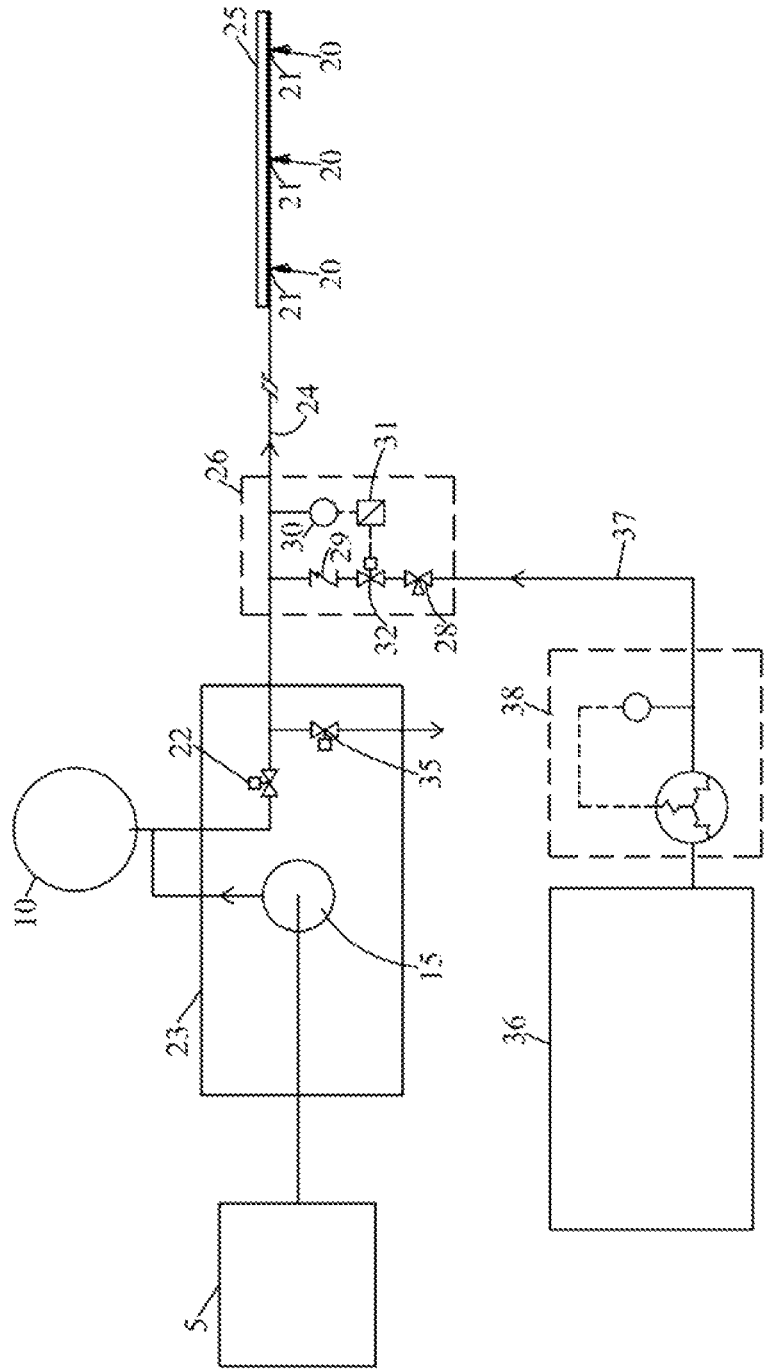
FIG. 2 shows a diagram of one embodiment of the misting system of the invention.

One embodiment of the misting system is shown in FIG. 2. Misting systems take tap or purified water from a water supply 5 and pressurize the water in a tank 10 to produce a spray 20. The misting system builds a usable volume of water pressure by pumping the water through a pump 15, or other pressure source, into the holding tank 10 or accumulator at approximately 100 psi (689 kPa). The tank 10 is separated from nozzles 21 by a high pressure valve 22, which can hold pressure in the tank 10 at a high pressure of at least 125 psi (862 kPa) or another desired pressure, located in a misting box 23. Preferably, the high pressure valve 22 is a solenoid valve. Preferred solenoid valves include solenoid valves of the media-separated type (where the media does not touch the metal components of the valve). The misting box 23 also contains the pump 15 and purge valve 35. Preferably, the purge valve 35 is a solenoid valve. The misting box 23 may be a compartment holding its components or an arrangement of components with no housing. The misting box 23 may also be located in a larger box holding purification components. The misting box 23 may be a stand-alone system or it may be incorporated in any equipment used in the misting system. At the time of misting, the high pressure valve 22 opens, sending high pressure water through misting line 24 to a misting bar 25 and nozzles 21.

A timer/valve unit 26 that communicates with the misting line 24 has a pressure sensor, or pressure switch, 30, a timing control, or timer, 31, and a solution valve 32, which is preferably a solenoid valve, on an injection line 37. The unit 26 controls the timing of and power to the solution valve 32. The unit 26 may be a compartment holding its components or an arrangement of components with no housing. The unit 26 may be a stand-alone system or it may be incorporated in a mister or any other equipment used in the misting system. Preferably, the timer 31 is a delay-on-break type, where the delay starts timing after the signal is removed. The timing control 31 starts when the pressure switch 30 detects a loss of pressure and resets when the time setting is completed. The unit 26 may also have an accumulator (not shown), a needle valve 28 and a check valve 29 in any arranged order. The needle valve 28 regulates flow of the biocidal solution and the check valve 29 prevents water from going from the misting line 24 to the injection line 37. Exemplary valves include needle valves of the non-metallic type, such as PVC, and check valves of proper plastic and a high-grade metal spring, such as Hastelloy® manufactured by Haynes International Inc., Kokomo, Ind.

Figure 3:
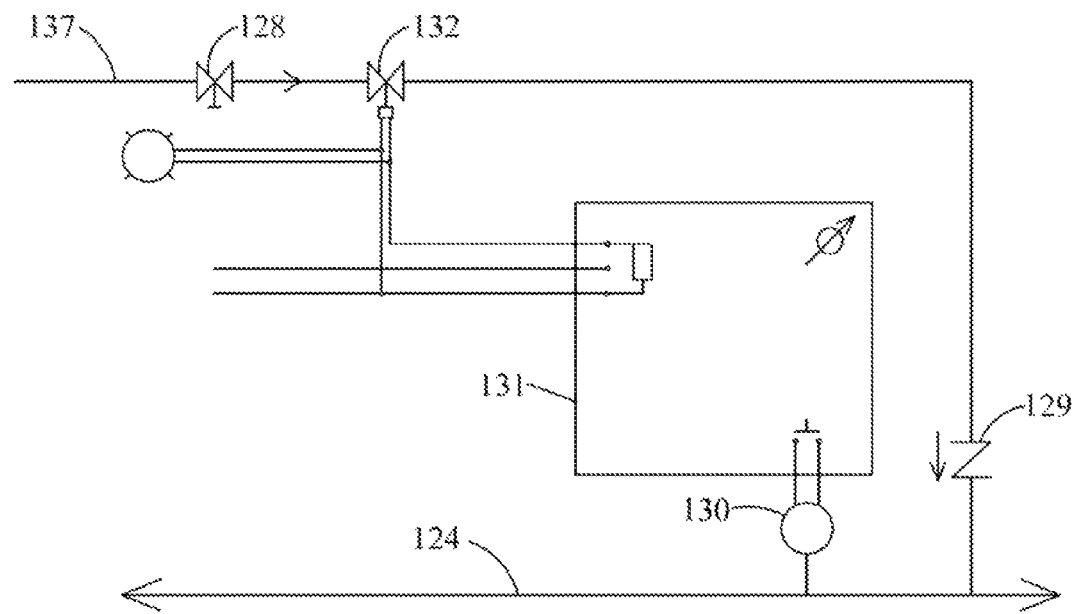
FIG. 3 shows a diagram of an exemplary timer/valve unit of the invention.

One example of the timer/valve unit is shown in FIG. 3. This unit has a solution valve 132 that opens and closes based on the reading of the pressure switch, or detector, 130. The detector may also be a timer or other device. The needle valve 128 regulates the flow of the biocidal solution from the feed line 137 to the misting line 124. The check valve 129 prevents water from going from the misting line 124 to the feed line 137.

As shown in FIG. 2, when the pressure sensor 30 senses high pressure through the misting line 24, the sensor 30 sends a signal to the timing control 31, which in turn opens the solution valve 32. At this time, there is no flow of biocidal solution because the pressure in the misting line 24 is greater than the pressure in the injection line 37.

At the end of the pressurization phase, the misting system purges the misting line 24 by closing the high pressure valve 22 and opening the purge valve 35 to, among other things, prevent dripping from the nozzles 21. The pressurized water is directed from the nozzles 21 through the purge valve 35 to a drain. The absence of the pressure signal to the pressure sensor starts a timing delay, where the solution valve 32 is kept open during this purge phase. During this short purge phase, biocidal solution from a source 36 is injected via the injection line 37 into the misting line 24. Preferably, a pump or pressure source 38 of biocide is used to inject the solution into the misting line 24. Preferably, the pressure of the biocidal solution ranges from about 10-60 psi (69.0-413.7 kPa). The actual volume injected depends upon the needs of the system, the size of the misting system, and the number of nozzles used.

At the end of the timing delay, the timing control 31 closes the solution valve 32. The biocidal solution remains stationary in misting line 24 (with a little diffusion) until the next pressurization cycle at which point the mist sprayed will have both water and biocidal solution. The biocidal solution comprises, preferably, 5-15%, and more preferably, 8-12%, by volume of the water and biocidal solution mixture. In one embodiment, the biocidal solution comprises about 10% by volume of the mixture.

Figure 4:
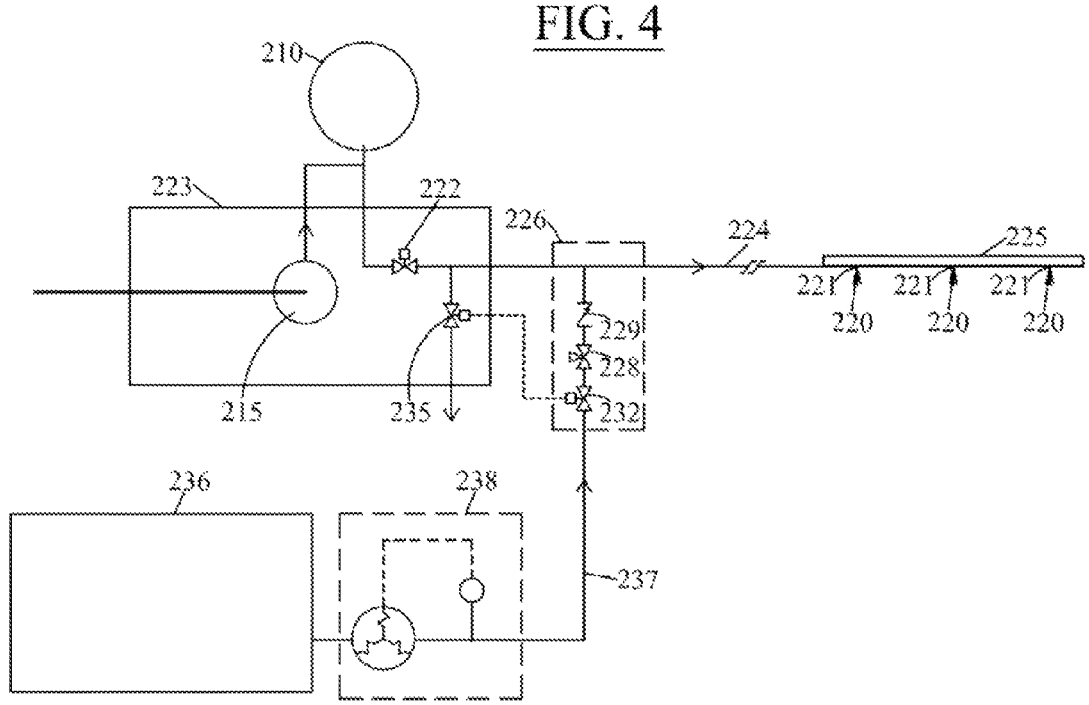
FIG. 4 shows a diagram of another embodiment of the misting system of the invention.

Another embodiment of the misting system is shown in FIG. 4. In this system, the misting box 223 contains a pump 215, high pressure valve 222, and purge valve 235. Purge valve 235 operates as a detector and communicates with a solution valve 232. Preferably, this communication is done electronically. Tank 210 provides pressurized water to the misting line 224 and to the misting bar 225 and nozzles 221 to produce spray 220. Biocidal solution is provided via source 236 and a pressure source 238.

A unit 226 that communicates with the misting line 224 has a solution valve 232, which is preferably a solenoid valve, on an injection line 237. The unit 226 controls the timing of and power to the solution valve 232. The solution valve 232 may be energized by voltage being sent to the purge valve 235 and opens to allow the biocidal solution to flow to the misting line 224. The unit 226 may be a compartment holding its components or an arrangement of components with no housing. The unit 226 may be a stand-alone system or it may be incorporated in a mister, misting box 223, or any other equipment used in the misting system. The unit 226 may also have a needle valve 228 and a check valve 229.

In this system, during the purge phase, a signal is sent to the solution valve 232 to open and the biocidal solution under pressure is pushed from the injection line 237 into the misting line 224. The flow of the biocidal solution is regulated by the needle valve 228.

Figure 5:
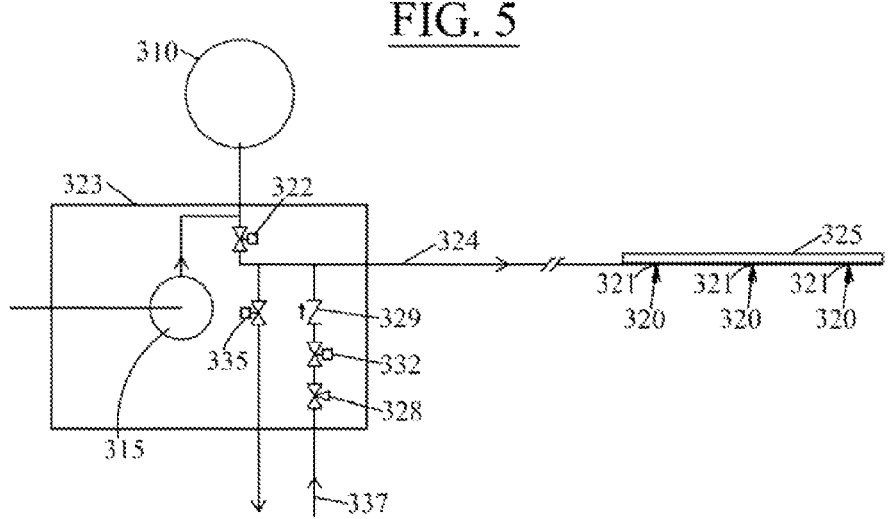
FIG. 5 shows a diagram of yet another embodiment of the misting system of the invention.

Yet another embodiment of the misting system is shown in FIG. 5. In this system, the misting box 323 contains a pump 315, high pressure valve 322, purge valve 335, and a needle valve 328, solution valve 332, and check valve 229 on an injection line 337. Tank 310 provides pressurized water to the misting line 324 and to the misting bar 325 and nozzles 321 to produce spray 320. In this embodiment, there is no need for detection methods or separate housing because biocidal injection is controlled by valves, such as needle valve 328, solution valve 332, and/or check valve 229. The solution valve 332 may be energized by voltage being sent to the purge valve 335 and opens to allow the biocidal solution to flow to the misting line 324. This system operates similar to the system shown in FIG. 4, but all of the components are installed in the same misting box.

While the invention has been described in detail and with reference to specific embodiments thereof, it will be apparent to one skilled in the art that various changes and modifications can be made therein without departing from the spirit and scope thereof. For example, different valve configurations for solution flow may be used. Thus, it is intended that the invention covers the modifications and variations of this invention provided they come within the scope of the appended claims and their equivalents.

The invention claimed is:

1. A method of providing a mist in a grocery display comprising:
    providing a misting rack with at least one nozzle, a supply of water, a supply of biocidal solution, a misting line connecting the supply of water to the misting rack, and an injection line, including a first solution valve for connecting the supply of biocidal solution to the misting line;
    providing a control system that (a) activates the injection of the biocidal solution into the misting line such that the biocidal solution mixes with the water in the misting line and (b) stops injection of the biocidal solution after the biocidal solution is injected;
    receiving a signal;
    injecting the biocidal solution into the misting line based on the signal;
    mixing the water and the biocidal solution to form a mixture;
    increasing the pressure in the misting line; and
    spraying the mixture under pressure through the nozzles.

2. The method of claim 1 wherein the receiving comprises: sending a voltage to a purge valve; and energizing the solution valve to allow flow of the biocidal solution.

3. The method of claim 1 wherein (a) the control system includes a pressure switch that measures pressure in the misting line and (b) the receiving comprises detecting a pressure in the misting line and injecting the biocidal solution into the misting line after a change in the pressure.

4. The method of claim 1 further comprising: supplying a misting box having a purge valve that opens to purge the misting line, a high pressure valve that feeds the misting line, and a pressure source that feeds the supply of water to the misting line.

5. The method of claim 1 wherein the control system further includes a second solution valve.

6. The method of claim 5 further comprising: supplying a control system that opens the first solution valve to inject the biocidal solution into the misting line such that the biocidal solution mixes with the water in the misting line and closes the first solution valve after the biocidal solution is injected.

7. The system of claim 1 wherein the control system includes a pressure switch that measures pressure in the misting line and the pressure switch senses when a pressure in the misting line decreases and resets when the pressure increases.

\* \* \* \* \*